(12) United States Patent
Benthien

(10) Patent No.: US 7,895,810 B2
(45) Date of Patent: Mar. 1, 2011

(54) CRASH PADDLE FOR REINFORCING A PRIMARY FUSELAGE STRUCTURE OF AN AIRCRAFT

(75) Inventor: Herrmann Benthien, Sottrum (DE)

(73) Assignee: Airbus Deutschland GmbH, Hamburg (DE)

( * ) Notice: Subject to any disclaimer, the term of this patent is extended or adjusted under 35 U.S.C. 154(b) by 618 days.

(21) Appl. No.: 12/009,620

(22) Filed: Jan. 18, 2008

(65) Prior Publication Data

US 2008/0173758 A1 Jul. 24, 2008

Related U.S. Application Data

(60) Provisional application No. 60/881,640, filed on Jan. 22, 2007.

(30) Foreign Application Priority Data

Mar. 9, 2007 (DE) .......................... 10 2007 011 618

(51) Int. Cl.
*E04C 3/00* (2006.01)
*B64C 1/00* (2006.01)

(52) U.S. Cl. .............................. 52/831; 52/837; 244/119

(58) Field of Classification Search .................... 52/831, 52/836, 837, 838, 841, 847, 657, 223.8, 223.14, 52/167.3; 244/117 R, 119, 124, 123.1, 123.14, 244/123.7
See application file for complete search history.

(56) References Cited

U.S. PATENT DOCUMENTS

| 571,042 | A | 11/1896 | Edquist |
| 2,556,076 | A | 6/1951 | Evans et al. |
| 2,556,077 | A | 6/1951 | Fetterly et al. |

(Continued)

FOREIGN PATENT DOCUMENTS

DE 19 724941 12/1998

(Continued)

OTHER PUBLICATIONS

Notice of Allowance for U.S. Appl. No. 12/009,150 dated Sep. 30, 2008.

(Continued)

*Primary Examiner* — Brian E Glessner
*Assistant Examiner* — Benjamin Pevarski
(74) *Attorney, Agent, or Firm* — Jenkins, Wilson, Taylor & Hunt, P.A.

(57) ABSTRACT

Disclosed is a crash paddle for reinforcing a primary fuselage structure of an aircraft. The crash paddle may be used for connecting the floor to the primary fuselage structure. The crash paddle includes a beam with in particular an H-shaped cross-sectional geometry, butt straps being arranged at both ends of the beam for connecting the crash paddle. In the region of the ends of the beam, the beam respectively has a resting surface 13, 14, the geometrical shape of which substantially corresponds to a hollow cylinder halved in the longitudinal direction. Placed around both resting surfaces and the longitudinal sides of the beam, in a peripheral groove is at least one endless loop. The endless loops respectively comprise an arrangement of reinforcing fibers, which is formed by a plurality of reinforcing fibers, such as for example carbon fibers, running substantially parallel to the longitudinal axis of the beam. The presence of the endless loops allows the crash paddle to absorb safely the tensile forces that are generally relevant in critical flying situations. The beam can therefore be dimensioned lighter for the usually considerably smaller compressive and tensile loads that occur in normal flying operation, so that a considerable weight saving is obtained.

10 Claims, 2 Drawing Sheets

U.S. PATENT DOCUMENTS

| | | | |
|---|---|---|---|
| 2,642,109 A | | 6/1953 | Hollerith |
| 2,700,412 A | | 1/1955 | Evans et al. |
| 2,758,365 A | | 8/1956 | Ricefield |
| 2,789,457 A | | 4/1957 | Allen |
| 2,920,672 A | | 1/1960 | Bronson |
| 3,208,496 A | | 9/1965 | Phelan |
| 3,314,720 A | | 4/1967 | Millington et al. |
| 3,868,143 A | | 2/1975 | Reilly |
| 4,005,765 A | | 2/1977 | Reilly |
| 5,180,263 A | | 1/1993 | Flowers, Jr. |
| 5,580,642 A | * | 12/1996 | Okamoto et al. ............. 428/212 |
| 5,683,131 A | | 11/1997 | Lucas |
| 6,332,301 B1 | * | 12/2001 | Goldzak ......................... 52/838 |
| 6,394,393 B1 | | 5/2002 | Mort |
| 6,421,979 B1 | * | 7/2002 | Fischer et al. ............. 52/745.19 |
| 6,663,314 B2 | | 12/2003 | Bequet |
| 6,811,861 B2 | * | 11/2004 | Bank et al. .................. 428/297.4 |
| 6,889,939 B2 | | 5/2005 | Rouyre et al. |
| 7,462,006 B2 | | 12/2008 | Benthien |
| 7,594,701 B2 | | 9/2009 | Kawabata et al. |
| 7,775,479 B2 | | 8/2010 | Benthien |
| 2003/0205011 A1 | | 11/2003 | Bequet |
| 2004/0245391 A1 | | 12/2004 | Kunzel et al. |
| 2004/0258498 A1 | | 12/2004 | Bruns |
| 2005/0211833 A1 | | 9/2005 | Frantz et al. |
| 2005/0224650 A1 | | 10/2005 | Reed et al. |
| 2006/0011781 A1 | | 1/2006 | Knoll et al. |
| 2006/0108477 A1 | | 5/2006 | Helou, Jr. et al. |
| 2006/0150571 A1 | * | 7/2006 | Zahner, III .................. 52/729.2 |
| 2006/0237586 A1 | | 10/2006 | Barackman et al. |
| 2007/0209314 A1 | * | 9/2007 | Vaughn ........................ 52/720.1 |
| 2008/0128550 A1 | * | 6/2008 | Roming et al. ............... 244/119 |
| 2008/0173755 A1 | | 7/2008 | Benthien |
| 2010/0044510 A1 | | 2/2010 | Schroeer et al. |

FOREIGN PATENT DOCUMENTS

| | | |
|---|---|---|
| DE | 10 324648 | 12/2004 |
| FR | 2599793 | 11/1987 |
| FR | 2821129 | 8/2002 |
| FR | EP 1234984 | 8/2002 |
| FR | 2836890 | 9/2003 |
| FR | EP 1342927 | 9/2003 |
| FR | 2883939 | 10/2006 |
| GB | 2026623 | 2/1980 |

OTHER PUBLICATIONS

Office Action Non-Final for U.S. Appl. No. 12/008,975 dated Jun. 14, 2010.

International Search Report for PCT/EP/2008/050292 dated May 19, 2008.

German Office Action for DE 10 2007 011611 dated Dec. 8, 2009.

German Office Action for DE 10 2007 011621 dated Dec. 10, 2009.

Notice of Allowance from U.S. Appl. No. 12/009,625 dated May 18, 2010.

Office Action dated Dec. 14, 2009 from U.S. Appl. No. 12/009,625.

Non-Final Office Action from U.S. Appl. No. 12/009,149 dated Oct. 19, 2010.

* cited by examiner

CRASH PADDLE FOR REINFORCING A PRIMARY FUSELAGE STRUCTURE OF AN AIRCRAFT

CROSS-REFERENCE TO RELATED APPLICATIONS

This application claims the benefit of U.S. Provisional Application No. 60/881,640, filed Jan. 22, 2007 and German Patent Application No. 10 2007 011 618.9, filed Mar. 9, 2007, the entire disclosures of which are herein incorporated by reference.

FIELD OF THE INVENTION

The invention relates to a crash paddle for reinforcing a primary fuselage structure of an aircraft, comprising a beam and a butt strap arranged respectively at one of the two ends of the beam for connecting the crash paddle to the primary fuselage structure of the aircraft.

BACKGROUND OF THE INVENTION

Known embodiments of crash paddles are formed with preference by a high-strength aluminum alloy material or by a carbon fiber reinforced polymer material. The crash paddles generally serve for reinforcing the primary structure of aircraft and form a virtually rigid connection between the elements concerned of the fuselage structure that are to be connected, stiffened or reinforced. In particular, such crash paddles are used for producing the floor connection in aircraft.

The crash paddles have to absorb all the flight loads that are normally present in the aircraft as well as the crash loads additionally occurring in extreme situations. Here, the ratio between the flight loads and the crash loads is very high. In addition, the flight loads require a rigid connection, whereas a flexible connection is adequate for crash loads. Since the known crash paddles are always also designed for the increased crash loads, this leads to an unnecessary increase in weight. On account of the design of the crash paddles to withstand extremely high static loads including the crash loads, high enforced loads occur as a result of thermal expansion effects on account of the rigid design.

SUMMARY OF THE INVENTION

One of the objects of the invention is to provide a crash paddle which can absorb the full crash loads with at the same time a reduced weight.

Accordingly, a crash paddle for reinforcing a primary fuselage structure of an aircraft comprises a beam having two ends, the ends of the beam having resting surfaces, the shaping of which respectively corresponds in particular to that of a longitudinally halved hollow cylinder; butt straps that are arranged respectively at each of the two ends of the beam for connecting the crash paddle to the primary fuselage structure of the aircraft; and at least one endless loop having at least one of cable form and strip form, the endless loop surrounding the beam and running substantially parallel to a longitudinal axis of the beam, the at least one endless loop being formed by an arrangement of reinforcing fibers.

The fact that the ends of the beam of the crash paddle have resting surfaces, the shaping of which respectively corresponds in particular to that of a longitudinally halved hollow cylinder, and that the beam is surrounded by at least one endless loop in cable form and/or strip form running substantially parallel to a longitudinal axis of the beam, with the at least one endless loop being formed by an arrangement of reinforcing fibers, means that there is adequate load-bearing capacity for the flight loads that normally occur. As a result of the reinforcing arrangement formed in a loop-like manner, the crash paddle according to the invention can also absorb the crash loads that far exceed the normal flight loads, although only tensile forces can be absorbed by the arrangement of reinforcing fibers.

The butt straps arranged on both sides of the crash paddle, with a substantially square base area, serve for the rigid connection of the crash paddle to the primary structure, the connection being made with preference by riveted and/or screwed connections.

Adjustability of the length of the crash paddle and articulated connection to the primary structure of the aircraft are not envisaged and are not possible. An entirely rigid integration of the crash paddle into the primary structure takes place by means of the fastening butt straps, in particular in the region of the so-called floor connection.

The fact that the at least one endless loop surrounding the beam of the crash paddle is formed by at least one arrangement of reinforcing fibers means that there is a very high tensile load-bearing capacity of the crash paddle, allowing all flight and crash loads that occur in a critical emergency situation to be safely intercepted. The static design of the beam of the crash paddle is based here on the considerably lower flight loads in normal operation, so as to obtain a weight saving in comparison with conventional crash paddles, in the case of which the connecting beam is dimensioned for the loads that are possible in all conceivable flying situations, including the crash loads occurring in an emergency.

Since the arrangement of reinforcing fibers is preferably not impregnated with a thermoplastic or thermosetting material, that is to say is not enclosed in a resin matrix in the way that is generally customary with fiber reinforced polymer materials, further weight-saving effects are obtained. This is so since the proportion by volume of fibers in the fiber composite materials is rarely higher than 70%.

All reinforcing fibers that can adequately withstand mechanical loads, such as for example carbon fibers, glass fibers, aramid fibers, ceramic fibers or any desired combination of these, come into consideration as reinforcing fibers for forming the arrangement of reinforcing fibers. In principle, the arrangement of reinforcing fibers may also be formed by wrapping at least one "endless" reinforcing fiber around the beam. The individual, discrete reinforcing fibers (filaments) may be grouped together to form reinforcing fiber strands, which are then intertwined, interwoven, braided together or twisted together to form, for example, an arrangement of reinforcing fibers in cable form and/or strip form. In principle, it is also possible to proceed in this way with the individual, discrete filaments.

In one embodiment, at least two endless loops are led around the beam, parallel to the longitudinal axis of the beam.

The resting surfaces at the end of the beam, the geometrical shape of which respectively corresponds approximately to that of a halved hollow cylinder, ensure secure abutment and guidance of the arrangement of reinforcing fibers in loop form. As a result, effective tensile force transmission between the butt straps fastened on the structure side is obtained.

According to another embodiment, the beam of the crash paddle has an H-shaped cross-sectional geometry.

As a result, on the one hand high buckling resistance of the beam connecting the (fastening) butt straps and on the other hand good lateral guidance of the at least one arrangement of reinforcing fibers wrapped around the beam in the longitudinal direction are obtained, because the arrangement of reinforcing fibers is guided along the side surfaces of the beam.

One embodiment of the crash paddle provides that the butt straps and the beam are formed by a metallic material and/or by a fiber reinforced polymer material.

As a result, a high load-bearing capacity of the crash paddle with tensile and compressive forces is obtained. The butt straps for connecting the crash paddle to the primary fuselage structure of the aircraft may be riveted to the (connecting) beam or welded to it. Alternatively, the crash paddle may be formed in one piece, in particular if it is formed by a fiber reinforced polymer material, such as for example a carbon fiber reinforced epoxy resin. An alignment oriented with the flux of force is chosen here with preference for the individual, discrete reinforcing fibers or the filaments within the fiber reinforcement.

According to a further embodiment, it is provided that the arrangement of reinforcing fibers is under a mechanical prestress.

The mechanical prestress achieves the effect that, in a crash situation, no prior tensioning of the crash paddle is required any longer., and consequently tensile forces can be immediately absorbed to the full extent. However, the intensity of the mechanical prestress must not be chosen too high here, since otherwise the load-bearing capacity of the crash paddle with regard to compressive forces is reduced.

BRIEF DESCRIPTION OF THE DRAWINGS

In the figures, the same structural elements are denoted by like reference numerals.

DETAILED DESCRIPTION OF THE INVENTION

Figure 1:
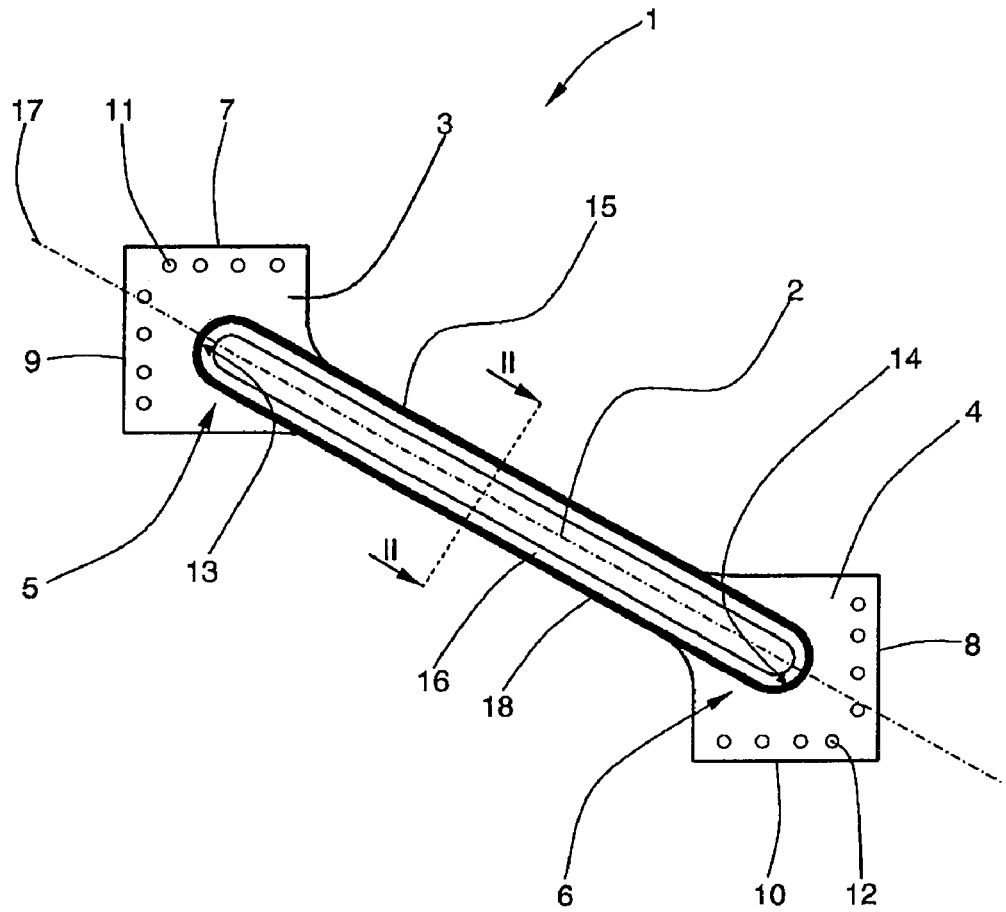
FIG. 1 shows a plan view of the crash paddle according to the invention.

FIG. 1 shows a plan view of the crash paddle according to the invention.

A crash paddle 1 comprises a continuous beam 2 with two butt straps 3, 4. The butt straps 3, 4 are firmly connected to the beam 2 in the region of the ends 5, 6 of the beam. The entire crash paddle 1 may be formed in one piece or integrally, that is to say in this case the butt straps 3, 4 and the beam 2 form one unit.

A one-piece form of the crash paddle 1 is suitable whenever the crash paddle 1 is formed by a fiber reinforced polymer material, such as for example a carbon fiber reinforced epoxy resin. Alternatively, it is possible to form the crash paddle 1 completely, or at least partially, by an aluminum alloy material with a high mechanical strength. In this case, the butt straps 3, 4 are welded to the beam 2 or riveted to it. Alternatively, it is possible to mill the crash paddle 1 out from an aluminum alloy material in one piece, which however requires a high level of machining effort, dependent on the geometrical shape of the crash paddle 1.

The butt straps 3, 4 in plate form have a substantially square base area and serve for connecting the crash paddle 1 to a primary structure of an aircraft that is not represented. With preference, the butt straps 3, 4 are respectively provided with a pattern of holes 11, 12 in the region of outer edges 7 to 10. By means of the pattern of holes 11, 12, locationally variable connection of the crash paddle 1 to the primary structure of the aircraft is possible by riveted and/or screwed connections.

In the region of the ends 5, 6 of the beam, the beam 2 respectively has resting surfaces 13, 14, which have a form that corresponds substantially to the geometrical shape of a halved hollow cylinder and which go over into the straight longitudinal sides 15, 16 of the beam 2.

Running substantially parallel to a longitudinal axis 17 of the beam is an (upper) endless loop 18, which lies against the beam 2, that is to say against both resting surfaces 13, 14 as well as against both longitudinal sides 15, 16 of the beam 2. The half-cylindrical resting surfaces 13, 14 ensure effective introduction into the endless loop 18 of the tensile forces acting on both butt straps 3, 4, in particular in the case of a crash.

The endless loop 18 is formed by an arrangement of reinforcing fibers, which in turn is formed by a plurality of reinforcing fibers that are not represented but run substantially parallel to the longitudinal axis 17 of the beam. With preference, at least one further endless loop is provided underneath the endless loop 18, covered by the upper endless loop 18 in FIG. 1 (cf. FIG. 2).

The individual reinforcing fibers within the arrangement of reinforcing fibers may, if required, be intertwined, interwoven, twisted together or braided together in certain portions, in order to form an endless loop 18 in cable form and/or in strip form. The reinforcing fibers, that is to say in this case discrete individual fibers or filaments, may in addition be initially grouped together to form reinforcing fiber strands, in which the reinforcing fibers run substantially parallel to one another. The reinforcing fiber strands may then in turn be intertwined, interwoven, twisted together or braided together.

In principle, it is also possible to form the arrangement of reinforcing fibers of the beam 2 by a wrapping comprising a plurality of turns with at least one (endless) reinforcing fiber.

Furthermore, the arrangement of reinforcing fibers may have a waterproof and diffusion-resistant enclosure, in order to ensure protection of the reinforcing fibers from external influences, such as for example in the form of condensed water when there is a great temperature gradient or corrosively acting dirt particles. The enclosure may be formed, for example, by a suitable plastic film or metal foil, a coating or the like.

With preference, the arrangement of reinforcing fibers is formed by carbon fibers or aramid fibers.

The arrangement of reinforcing fibers allows the crash paddle 1 according to the invention to absorb high tensile forces in the direction of the longitudinal axis 17 of the beam, which may, for example, occur in a crash situation of an aircraft. By contrast, the "normal" fight loads, which in comparison with such crash loads are smaller by a factor of up to 10, are substantially absorbed by the beam 2, which can absorb both tensile and compressive forces. As a result of the possibility in the case of the crash paddle according to the invention of providing different dimensioning for the respective type of load, a weight saving is obtained.

To allow the full crash load to be accepted without delay in a critical emergency situation, the arrangement of reinforcing fibers is, with preference, under a mechanical prestress. The prestress of the arrangement of reinforcing fibers must not be chosen too high, in order not to reduce the compressive load-bearing capacity of the beam 2 too much.

Figure 2:
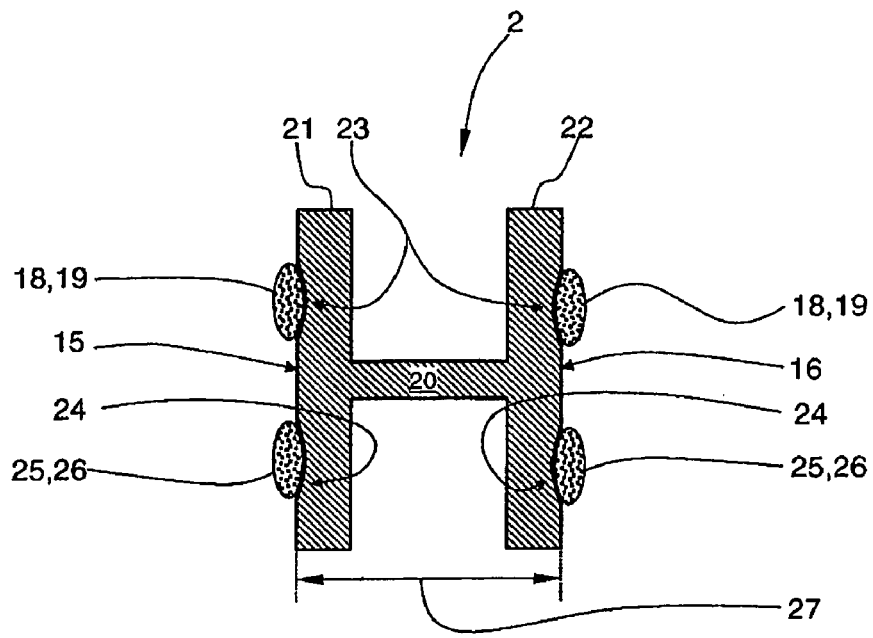
FIG. 2 shows a cross-sectional representation through the crash paddle along the sectional line II-II of FIG. 1.

FIG. 2 shows a cross-sectional representation through the crash paddle along the sectional line II-II in FIG. 1.

The beam 2 has an approximately H-shaped cross-sectional geometry and comprises a crosspiece 20, which is adjoined on both sides by a first leg 21 and a second leg 22, which form the straight longitudinal sides 15, 16 of the beam 2. The legs 21, 22 form with the crosspiece 20 an included angle of 90°. Two peripheral grooves 23, 24 have respectively been made in the two longitudinal sides 15, 16 of the beam 2. The endless loop 18 is guided in the (upper) groove 23, while a second endless loop 25, which represents a further arrangement of reinforcing fibers 26, runs in the (lower) groove 24. The grooves 23, 24 have a cross-sectional geometry that corresponds substantially to the cross-sectional geometry of the two endless loops 18, 25 and consequently makes possible abutment or guidance of the endless loops 18, 25 over the greatest possible surface area in the beam 2. The grooves 23, 24 prevent uncontrolled slipping of the endless loops 18, 25 in the vertical direction. The arrangements of reinforcing fibers 19, 26 have, with preference, a circular, elliptical or approximately rectangular cross-sectional geometry (endless loop in cable form or strip form). The individual discrete fibers or filaments in the arrangements of reinforcing fibers 19, 26 are symbolized in FIG. 2 by the dotting. A distance 27 between the side surfaces 15, 16 corresponds to the diameter of the half-cylindrical resting surface 13, 14.

Figure 3:
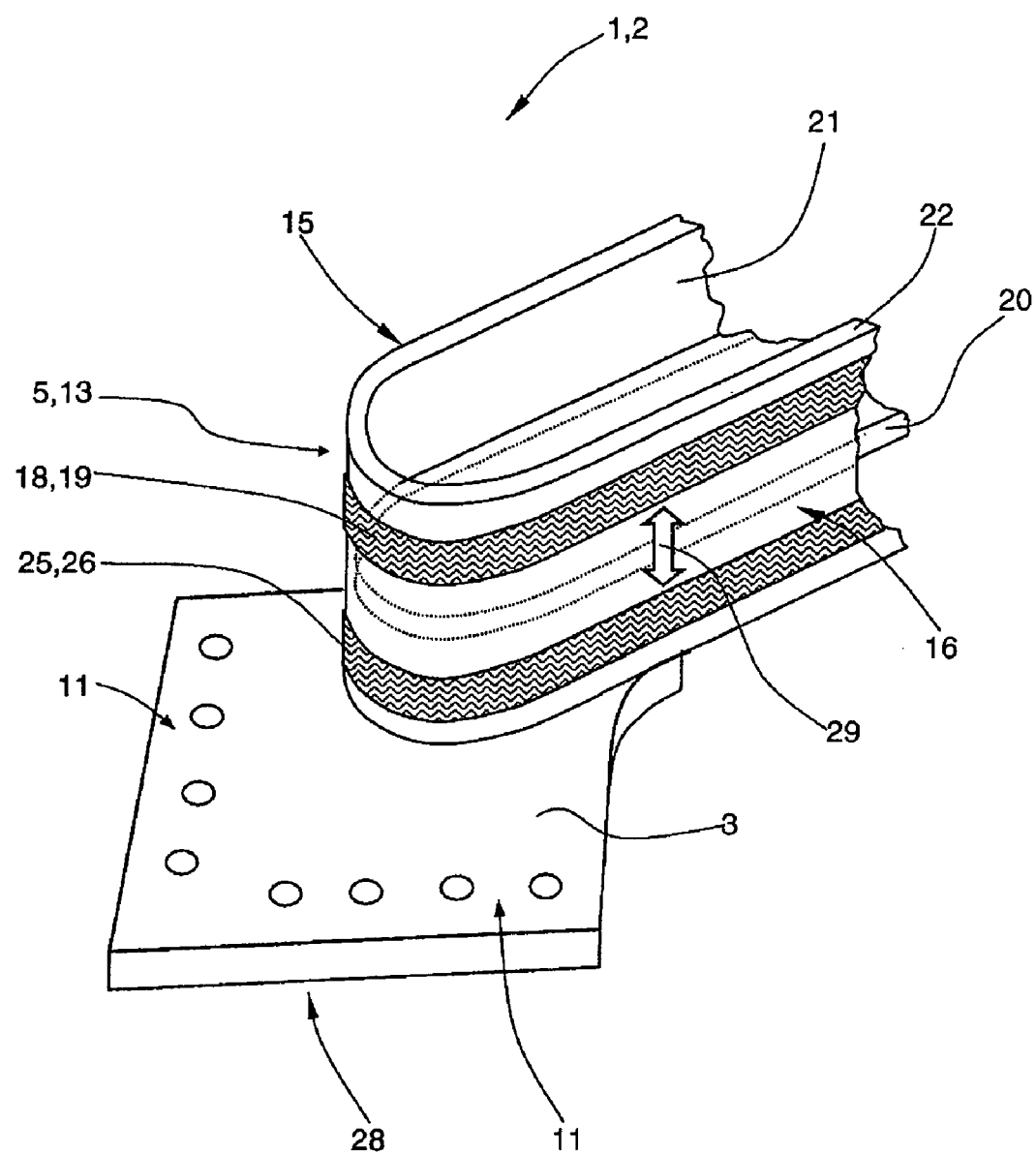
FIG. 3 shows a perspective view of an end of the beam of the crash paddle.

FIG. 3 shows a perspective view of one end of the beam of the crash paddle.

The resting surface 13 of the end 5 of the beam, the geometrical shape of which corresponds approximately to a hollow cylinder divided in the longitudinal direction, is ajoined on both sides by the straight longitudinal sides 15, 16 of the beam 2. The longitudinal sides 15, 16 are formed here by the first and second legs 21, 22 of the beam 2, which are connected by the crosspiece 20. The two legs 21, 22, which respectively run perpendicularly with respect to the crosspiece 20, from the substantially H-shaped cross-sectional geometry of the beam 2.

Arranged underneath the end 5 of the beam is the butt strap 3, which is provided with the pattern of holes 11. The beam 2 and the butt strap 3 may be formed in one piece or be firmly connected by suitable joining methods. The butt strap 3 has a substantially square bearing surface 28, by means of which the connection of the crash paddle 1 to the primary fuselage structure of the aircraft, which is not represented here, takes place.

The endless loops 18, 25, formed by the two arrangements of reinforcing fibers 19, 26, surround the beam 2, that is to say the resting surface 13, the longitudinal sides 15, 16 and the second (rear) resting surface 14, which is not represented. In this case, the securement of the endless loops 18, 25 against displacements in the direction of the double-headed arrow 29 takes place by means of the grooves, which are concealed here but in which the endless loops 18, 25 are arranged or guided (cf. FIG. 2).

What is claimed is:

1. A crash paddle for reinforcing a primary fuselage structure of an aircraft, the crash paddle comprising:
    a beam having two ends, the ends of the beam having resting surfaces, the shaping of which respectively corresponds to that of a longitudinally halved hollow cylinder;
    butt straps that are arranged respectively at each of the two ends of the beam for connecting the crash paddle to the primary fuselage structure of the aircraft; and
    at least one endless loop having at least one of cable form and strip form, the endless loop surrounding the beam and running substantially parallel to a longitudinal axis of the beam, the at least one endless loop being formed by an arrangement of reinforcing fibers.

2. The crash paddle according to claim 1, wherein the beam has an H-shaped cross-sectional geometry, at least one continuous groove, in which the arrangement of reinforcing fibers is guided, having respectively been made in both longitudinal sides of the beam and/or both resting surfaces.

3. The crash paddle according to claim 1, wherein at least one of the butt straps and the beam is formed by at least one of a metallic material and a fiber reinforced polymer material.

4. The crash paddle according to claim 1, wherein the arrangement of reinforcing fibers is made of a plurality of reinforcing fibers that run substantially parallel to the longitudinal axis of the beam.

5. The crash paddle according to claim 4, wherein the arrangement of reinforcing fibers are carbon fibers, glass fibers, aramid fibers, ceramic fibers or a combination of these.

6. The crash paddle according to claim 1, wherein the arrangement of reinforcing fibers is formed by reinforcing fibers, which are intertwined, twisted together, interwoven or braided together, at least in certain portions.

7. The crash paddle according to claim 1, wherein the arrangement of reinforcing fibers is substantially formed by at least one reinforcing fiber being wrapped around the beam with a plurality of turns.

8. The crash paddle according to claim 1, wherein the arrangement of reinforcing fibers is under a mechanical prestress.

9. The crash paddle according to claim 1, wherein the arrangement of reinforcing fibers has an enclosure to provide protection from external influences.

10. The crash paddle according to claim 1, wherein the butt straps respectively have a pattern of holes, to make riveting and/or screwing possible for the rigid connection to the primary fuselage structure.

* * * * *